Dec. 16, 1958  G. A. MITCHELL  2,864,270
BILLET CORING MACHINE
Filed Sept. 8, 1955  10 Sheets-Sheet 1

INVENTOR
GEORGE A. MITCHELL
BY *Francis J. Klempay*
ATTORNEY

Dec. 16, 1958

G. A. MITCHELL 2,864,270

BILLET CORING MACHINE

Filed Sept. 8, 1955

INVENTOR

GEORGE A. MITCHELL

BY *Francis J. Klempay*

ATTORNEY

Dec. 16, 1958  G. A. MITCHELL  2,864,270
BILLET CORING MACHINE
Filed Sept. 8, 1955  10 Sheets-Sheet 5

INVENTOR
GEORGE A. MITCHELL
BY *Francis J. Klempay*
ATTORNEY

Dec. 16, 1958    G. A. MITCHELL    2,864,270
BILLET CORING MACHINE
Filed Sept. 8, 1955    10 Sheets-Sheet 6

INVENTOR
GEORGE A. MITCHELL
BY Francis J. Klempay
ATTORNEY

Dec. 16, 1958    G. A. MITCHELL    2,864,270
BILLET CORING MACHINE
Filed Sept. 8, 1955    10 Sheets-Sheet 7

INVENTOR
GEORGE A. MITCHELL
BY Francis J. Klempay
ATTORNEY

Dec. 16, 1958   G. A. MITCHELL   2,864,270
BILLET CORING MACHINE
Filed Sept. 8, 1955   10 Sheets-Sheet 9

INVENTOR
GEORGE A. MITCHELL
BY *Francis J. Klempay*
ATTORNEY

Dec. 16, 1958  G. A. MITCHELL  2,864,270
BILLET CORING MACHINE
Filed Sept. 3, 1955  10 Sheets-Sheet 10

INVENTOR
GEORGE A. MITCHELL
BY Francis J. Klempay
ATTORNEY

United States Patent Office 2,864,270
Patented Dec. 16, 1958

2,864,270

BILLET CORING MACHINE

George A. Mitchell, Hubbard, Ohio, assignor to Lombard Corporation, Youngstown, Ohio, a corporation of Ohio Application September 8, 1955, Serial No. 533,144

30 Claims. (Cl. 77—3)

The present invention relates to metal working apparatus, and more particularly to a novel and improved apparatus for coring or cutting a central longitudinal bore in billets of aluminum and other metals, and for handling the billets prior to and following the coring operation.

In the process of extruding billets of aluminum, for example, particularly where hollow shapes are to be formed, it is desirable to provide a central aperture in the billet to be extruded so that the metal more readily flows about a mandrel or core member of the extruding die. In some instances this is accomplished by a so-called piercing operation, wherein prior to the actual extrusion operation, a pointed rod or piercing tool is forced axially through the billet. The pierced billet resembles a hollow cylinder, which is the desired form for certain extruding operations.

In certain cases, however, and particularly where harder alloys and/or large billets are used, proper piercing of the billets becomes difficult and impractical. In such cases it has been found more expedient to machine or cut the central core portion out of the billet, the billet previously having been cast with a rough core opening therein. It is accordingly the primary or overall object of the present invention to provide a novel and improved apparatus which is operative in a satisfactory and expedient manner to machine out the core portion of billets of aluminum and like metals.

One of the important specific objects of the invention resides in the provision of an apparatus for machining out the central core portions of cylindrical aluminum billets of large size which is characterized by the incorporation of a novel and improved arrangement for effecting relative movement of the machining cutters through the workpieces. More specifically, in this regard, it is a particular object of the invention to provide a novel billet coring machine wherein the unmachined billets are firmly gripped in a movable housing structure and advanced axially toward a rotating but otherwise fixed cutter assembly, the housing and billet being advanced sufficiently to cause the cutter means to be passed entirely through the billet in the manner desired.

The present invention contemplates the handling of aluminum billets of very large diameter, in the order of twenty-six inches in diameter, for example, in which there may be provided a machined core opening of as much as twenty inches in diameter. And while aluminum and like non-ferrous metals are relatively soft, they are relatively difficult to machine due to a tendency for the cutting tools to grab and bind. Thus, I contemplate the provision of heavy and high powered driving apparatus, in the order of sixty horsepower, for example, so that the cutters may be properly operated under the most adverse conditions. For this reason the power apparatus, including the drive motor and transmission therefor, and the cutters and supporting bars or shafts therefor are quite massive and heavy. This creates substantial problems in connection with the moving of the cutters into the work, as in conventionally designed boring mills, for example. Moreover, the present invention contemplates the handling of billets of up to four feet in length, creating substantial problems with respect to maintaining the cutters in accurate axial alignment with the billet during a machining operation.

All of the above problems are solved or substantially mitigated through the teachings of my invention by fixedly mounting the cutter mechanism, including the drive motor and transmission therefor, and properly advancing the workpiece or billet into the cutter. In this manner massive guide ways are eliminated, and it is possible to maintain optimum accuracy in the alignment of the cutter bar apparatus with the billet to be cored.

Another object of the invention, in connection with the feeding of the work relative to the cutting means, resides in the provision of a novel feeding drive system including a hydraulic actuator and a fluid system therefor by means of which the feeding pressure is at all times counteracted by a predetermined back pressure of less magnitude. The arrangement is such that as the work is advanced relative to the cutters and occasional soft spots in the metal, or voids therein, are encountered there is no sudden lurching of the feeding mechanism even though the resisting force thereon normally providing by the cutter is suddenly released or lessened substantially.

Another specific object of the invention is the provision of a novel arrangement for gripping cylindrical billets firmly and in accurately aligned relation to the axis of rotation of the cutting tools so that the billets may be advanced into the cutters in the manner desired. In this respect the invention contemplates the provision of a chucking mechanism which is operative to properly grip billets of various diameters, from in the order of twelve inches in diameter to in the order of twenty-six to thirty inches in diameter, the size of the billets, however, constituting no limitation or critical aspect of the invention.

In respect of the above object, it is a further specific object of the invention to provide an improved chuck mechanism which is adapted to firmly grip an elongated billet at spaced points along its axial extent, notwithstanding that the billet, which is generally cast, may be of somewhat irregular diameter.

Another object of the invention is the provision of a billet gripping chuck which comprises a plurality of axially stacked housing sections which may be readily assembled or disassembled as unitary elements, which may be arranged in any desired number to suit various job requirements, and which are otherwise possessed of novel and advantageous structural features providing for simplified manufacture and maintenance.

Yet another object of the invention resides in the provision of a novel, improved and more expedient arrangement for supplying billets to the coring apparatus, loading the billets into coring position, removing the billets from coring position and positioning the same for convenient transportation to the extrusion press or heating furnaces employed in connection therewith. As a first feature, this object contemplates the provision of an adjustable loading and storage apparatus capable of handling billets of all sizes and which is operative to effect the simultaneous loading and unloading of billets in the desired manner. The apparatus of the invention includes a novel arrangement of loading arms and platforms so that movement of the loading arms in a loading direction causes the simultaneous transverse movement of a new billet into position for loading and the discharge of a previously cored billet. Then upon subsequent retracting movement of the loading arms the new billet is positioned in alignment with the billet gripping chuck, while a new billet is moved into position for loading during a subsequent operation.

In connection with the above there is also an object to provide a novel and simplified arrangement for moving the billets axially into and out of the chuck housing.

One aspect of this last stated object is the provision of means carried by and movable with the chuck housing which is adapted to engage billets positioned in axially aligned relation therewith and to draw the billets thereby engaged into the interior of the chuck housing. Following the end of a coring operation the same means acts reversely to discharge the billet axially from the chuck housing into a position from which the billet may be discharged transversely into a storage rack.

Another aspect of the last stated object resides in the provision of an axially projecting billet support forming a fixed part of the overall apparatus and which is provided with a plurality of anti-friction rollers which engage and support a billet after it has been moved into axial alignment with the chuck housing so that the same may be easily drawn into the interior of the housing for gripping by the chuck means. The axially projecting support is suspended in cantilever fashion and is adapted upon a retracing movement of the chuck housing toward the billet loading station to project within the interior of the housing in such manner that a billet may be wholly supported by anti-friction rolls until such time as the chuck means is moved into gripping relation.

Another specific object of the invention is the provision of a novel and simplified stop means which is employed in connection with the chuck housing so that billets moved axially thereinto are automatically positioned in a predetermined axial relation to the chuck housing. In this respect it will be understood that the apparatus of the present invention contemplates the employment of cutters of up to twenty inches in diameter for the larger billets, while providing for the reception of billets of much smaller diameter than twenty inches. Thus, my novel billet stop arrangement is quickly adjustable so as to engage only the outer portion of the end surface of a billet of any size. In this manner it is assured that the stop will in no instance interfere with the cutter apparatus.

The above and other objects and advantages of the invention will become apparent upon full consideration of the following detailed specification and accompanying drawing wherein is illustrated a certain preferred embodiment of the invention.

In the drawing:

Figure 3 is an end elevation of the installation of Figure 1;

Figure 6 is a section taken generally along line VI—VI of Figure 4;

Figure 8 is an enlarged top plan view of the chuck housing forming a part of the apparatus of Figure 1;

Figure 1:
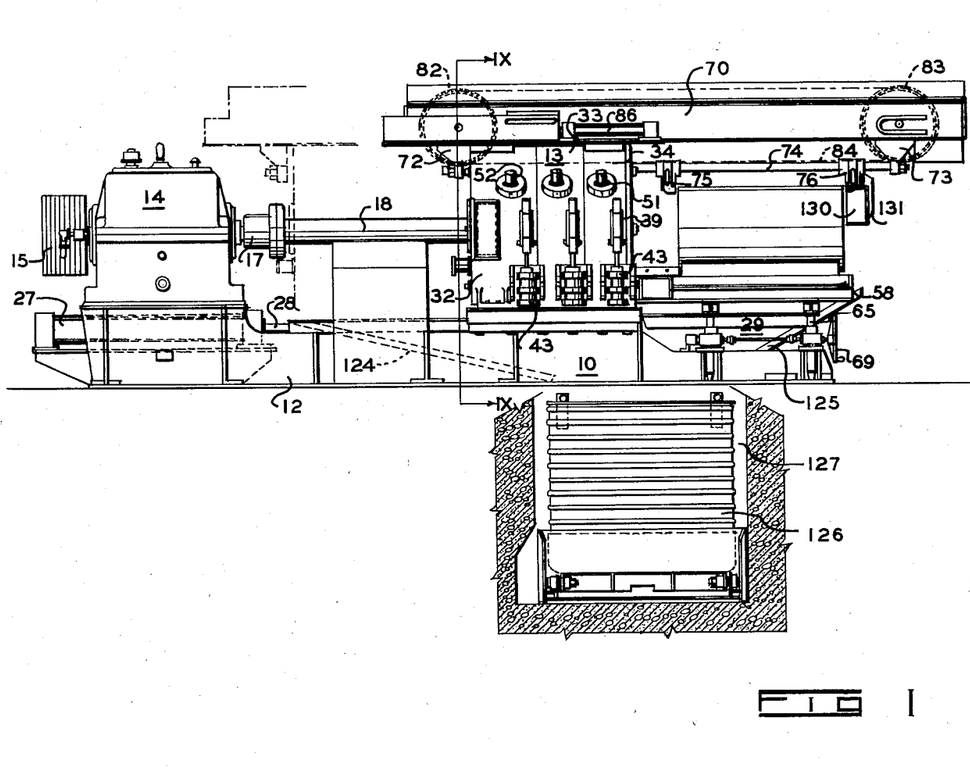
Figure 1 is a side elevation of a complete billet coring installation constructed in accordance with the teachings of my invention.
Figure 2:
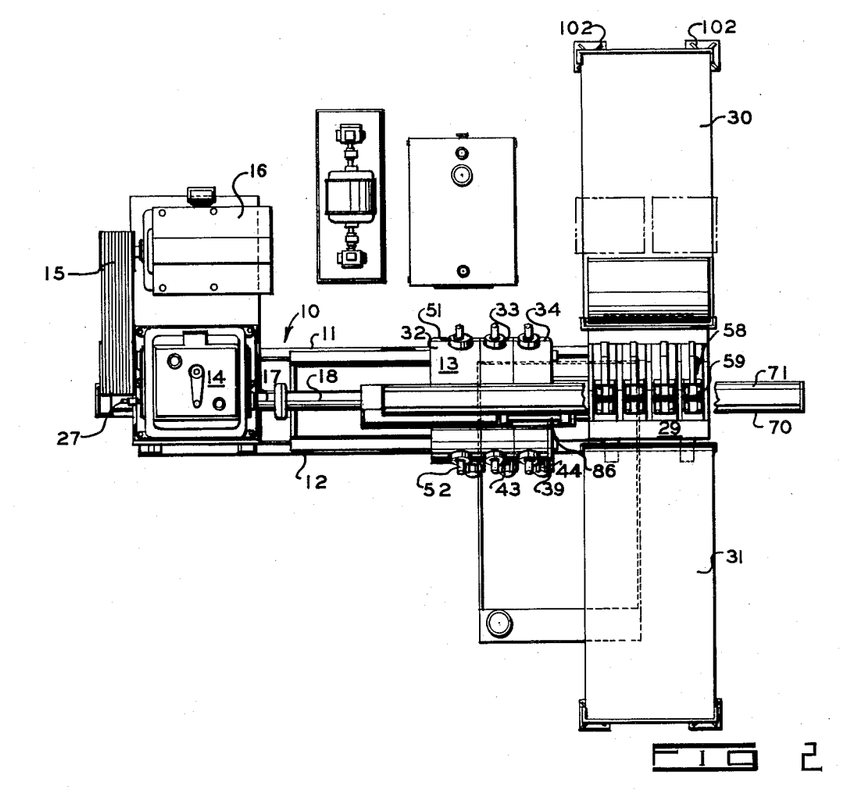
Figure 2 is a top plan view of the installation of Figure 1.

Referring now to the drawing, and initially to Figures 1, 2 and 3 thereof, the reference numeral 10 designates generally a heavy foundation structure which is comprised of a pair of spaced parallel supports 11 and 12 which define, intermediate their end portions, supporting ways for slidably mounting a movable chuck housing assembly, generally designated by the numeral 13.

At the left hand end of the foundation 10 there is rigidly mounted a transmission assembly 14 which is driven through a multi-belt drive 15 by means of a heavy duty motor 16. The motor 16, in the illustrated apparatus, may be of the order of sixty horsepower.

Extending inwardly from the right hand side of the transmission assembly 14 is an output shaft 17 to which is removably secured a boring bar assembly 18. The boring bar 18 is removably secured so that bars of various sizes may be accommodated, as will become more apparent as the description proceeds.

Figures 12, 13:
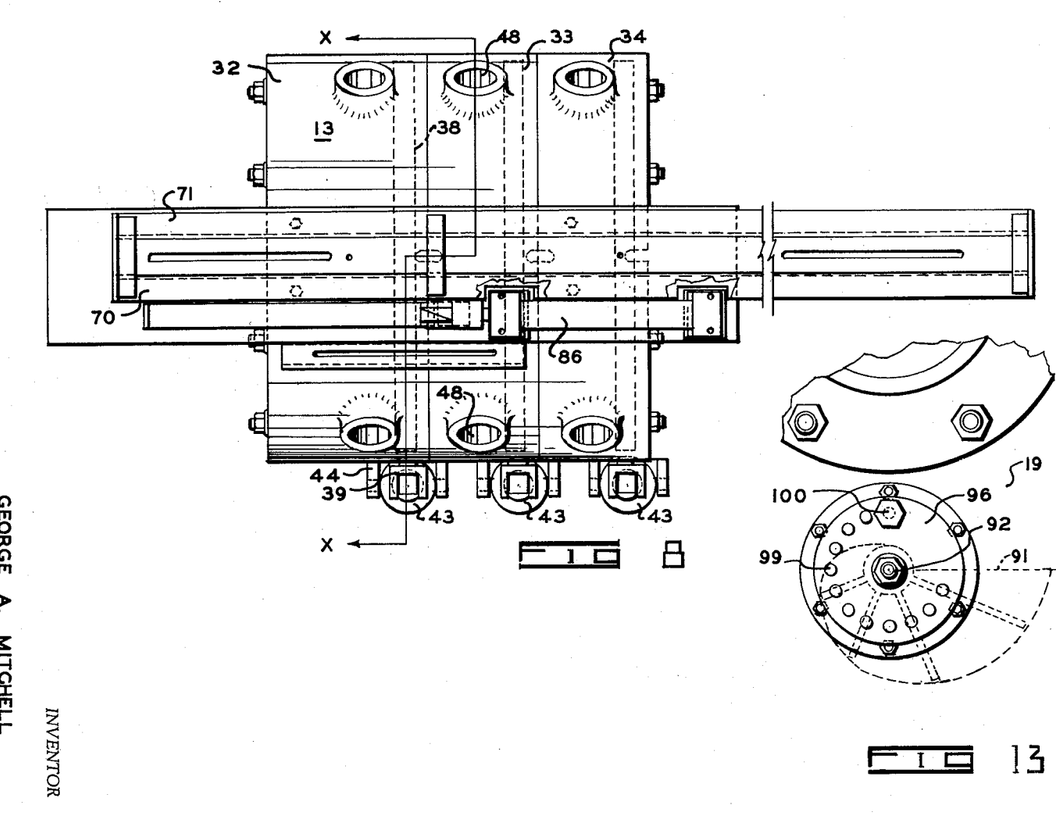
Figure 12 is an enlarged fragmentary longitudinal section through the chuck housing, illustrating details of the billet stop member.
Figure 13 is an enlarged fragmentary end view of the chuck housing illustrating further details of the billet stop arrangement.
Figure 12:
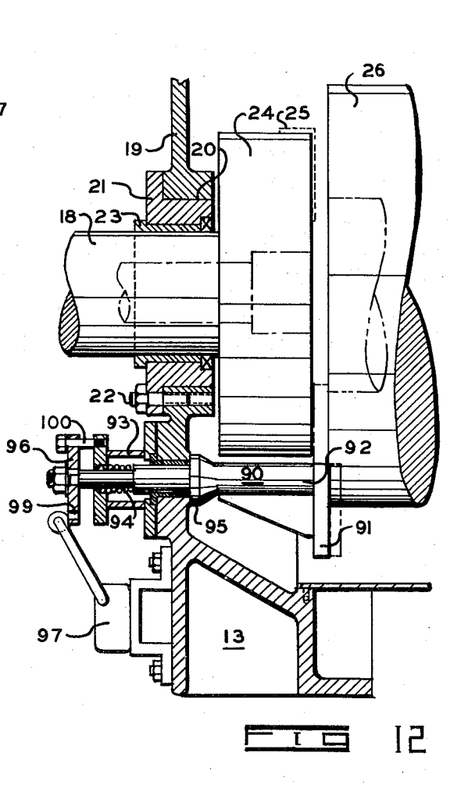

As clearly illustrated in Figure 12 of the drawing, the chuck housing 13 is provided with an end wall 19 facing the transmission assembly 14, which end wall is provided with a large central opening 20. Received within the opening 20 is a flanged adapter ring 21, which is removably secured to the end wall 19 by means of bolts 22, for example. Internally, the adapter ring 21 is provided with an anti-friction bushing 23 which is adapted to slidably and rotatably receive the forward end portion of the boring bar 18 so that the latter is properly supported and guided at all times.

Rigidly secured to the forward end extremity of the boring bar 18 is a milling cutter 24, which may be of more or less conventional design, having cutting teeth on the forward end face thereof, as at 25. In accordance with the teachings of the invention the milling cutter 24 is adapted to be rotated by the boring bar while the chuck housing 13 is advanced in the direction of the transmission assembly 14. Thus, a billet 26, which is gripped in the chuck housing in a manner to be described, is caused to move toward the rotating cutter 24, which remains stationary so that the billet moves into and past the cutter. In this respect, it will be understood that at least in the case of the larger diameter billets there is provided a partially cored opening, which is usually cast into the billet during the initial preparation thereof. The coring operation, then provides an accurately dimensioned and centered core so that the billets will be properly received in the extrusion press apparatus.

During the coring operation the boring bar 18 is at all times accurately guided and supported by means of the anti-frictionally bushed adapter ring 21 so that maximum accuracy is obtained.

In respect of the above, it will be readily understood that the present invention is not limited to the use of milling type cutters, to be used in boring previously cored billets, but is equally applicable to the use of elongated hollow cylindrical trepanning tools guided in the front bearing 21 and adapted for cutting a solid cylindrical core from a solid billet. For the purposes of the present invention the above two types of operations will be considered equivalent.

It is one of the important features of this invention that during the cutting or coring operation the chuck housing 13, with the billet 26 gripped firmly therein, is advanced toward the rotating but otherwise stationary cutter means. Thus, the nature of the apparatus is such that the drive mechanism and transmission assembly is massive and heavy so that to provide for the movement of this apparatus toward a fixed chuck housing would require massive supporting ways, involving substantial additional expense in manufacture and maintenance, and resulting in less accuracy in the coring operation. Another alternative, which is often employed in large boring mills, for example, is to provide for the longitudinal sliding movement of the boring bar 18 with respect to the drive mechanism therefor. However, I find this to be unsatisfactory in the present case since the nature of the material to be machined is such that the cutter grabs and binds occasionally, causing severe stresses to be placed upon the boring bar. This would necessitate constant and expensive maintenance if a slidable boring bar support should be employed.

For moving the chuck housing 13 toward and away from the cutting apparatus I have provided a long stroke hydraulic cylinder 27 which is mounted at the left end of the foundation 10 and which has its operating rod 28 connected to the housing 13. The manner in which the cylinder 27 is actuated also forms an important feature of the invention, as will be described later in the specification.

At the right hand end of the foundation 10 there is provided a billet loading and unloading mechanism, generally designated by the reference numeral 29, to be described in more detail, which is operative to transfer billets 26 from a first pallet 30 into alignment with the chuck housing 13, for subsequent loading into the housing, and to transfer machined billets onto a second pallet 31 at the opposite side of the machine.

Referring now in detail to Figures 1, 8, 9, 10 and 11, the chuck housing 13 is shown to comprise a plurality—three in the illustrated apparatus—of axially aligned and rigidly interconnected annular chucking sections 32, 33 and 34 defining a generally cylindrical housing. The front or left hand annular section 32 is preferably of cast construction, having an inwardly extending flange portion 35 intermediate its ends, and having an integral centrally apertured front wall 19. The central aperture 20 of the front wall 19, as heretofore described, is arranged to receive an adapter ring 21 for sildably and rotatably supporting the boring bar 18.

Figure 11:
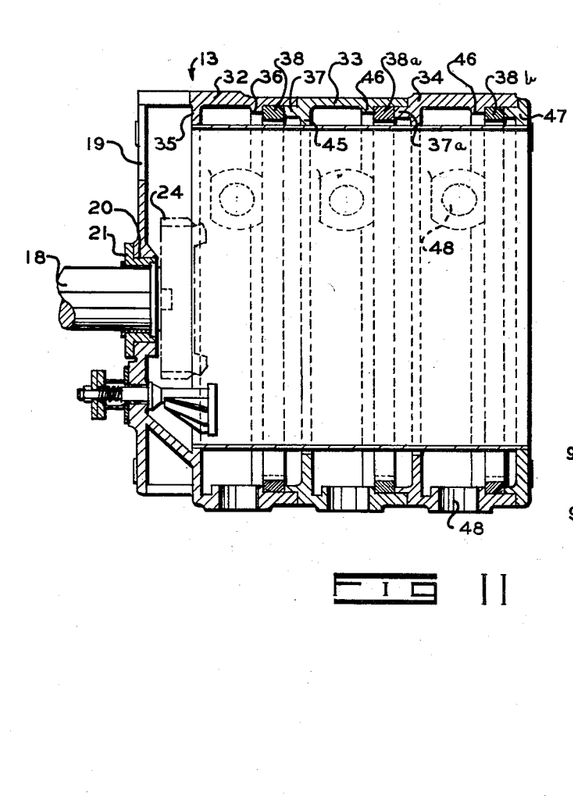
Figure 11 is a longitudinal section through the chuck housing, taken generally along line XI—XI of Figure 10.

Near the right hand or open end of the front chucking section 32 there is provided a second inwardly extending flange portion 36, defining an outwardly facing annular shoulder.

Received within the open outer end of the first chuck segment 32 is a forwardly extending reduced portion 37 of the second cast chuck segment 33. As will be observed in Figure 11, the second segment 33, the axial length of the reduced portion 37 is substantially less than the distance from the end of the first housing segment 32 to the first internal flange 36 therein. Thus, there is defined between the forward end surface of the reduced portion 37 and the outwardly facing shoulder of the flange 36 an annular channel which opens radially inwardly of the housing 13.

Retained within the channel thus defined and freely rotatable therein with respect to the housing 13 is a first large diameter ring gear 38 which is provided continuously or substantially continuously about its inner periphery with a plurality of gear teeth, not specifically identified. At one side of the ring gear 38 there is secured a radially outwardly extending arm 39 in which there are provided a plurality of circumferentially spaced bores 40. In one of the bores 40 there is received a pivot pin 41 which connects the arm 39 to the piston rod 42 of a small short stroke hydraulic cylinder 43.

The clyinder 43 is pivotally secured to the housing segment 32 by means of a bracket 44, so that upon actuation of the cylinder 43 in either direction the ring gear 38 is caused to rotate one way or the other with respect to the housing.

As will be observed in Figure 11, the second and third housing segments 33 and 34 are substantially identical, each being provided with a first inwardly extending flange portion 45, adjacent its forward end and a second inwardly extending flange 46 adjacent its opposite end.

In abutting relation with the flange 46 of the second housing segment 33 is a second ring gear 38a which is rotatably retained in the assembly by the said flange 46 and by the forwardly projecting reduced portion 37a of the second housing segment 33.

In a similar manner, the third housing segment is provided with a ring gear 38b, the last mentioned gear being retained in the assembly by means of an end cap member 47 which is secured to the open inner end of the last housing segment 34.

Each of the housing segments is provided with a separate hydraulic cylinder 43 and associated linkage, as described with respect to the first segment 32, so that the several ring gears 38, 38a and 38b are individually actuated.

Figure 10:
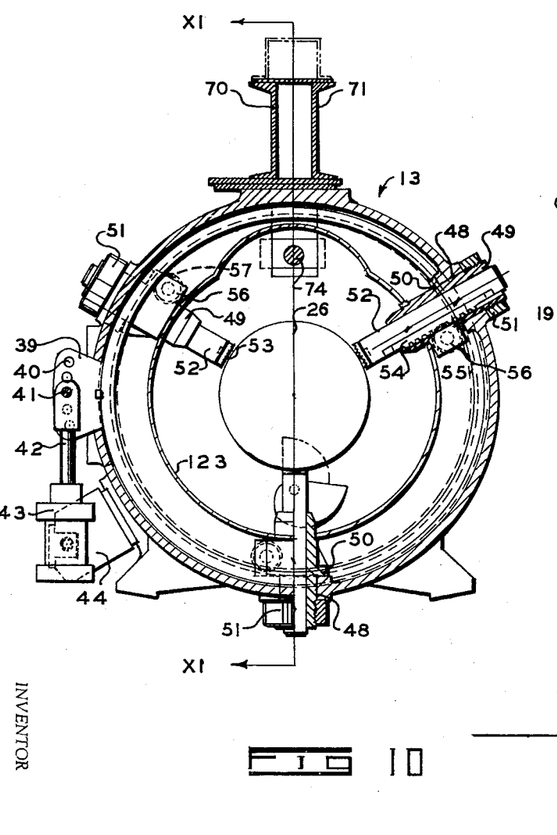
Figure 10 is an enlarged section view of the chuck housing taken generally along line X—X of Figure 8.

Having reference now to Figure 10 of the drawing, each of the housing segments 32—34 is provided with a plurality—preferably three—circumferentially spaced radial bores or openings 48, spaced approximately one hundred and twenty degrees apart, in which are received radially disposed cylindrical guide members 49. The guide members or sleeves 49 are provided with outwardly projecting flanges 50 intermediate their ends which are adapted to engage the inner surface portions or bosses surrounding the several bores 48. The flanges 50 are so positioned that when the guide sleeves 49 are properly assembled with the housing segments the outer ends of the sleeves project outwardly of the segments. These projecting outer ends are threaded to receive similarly threaded collars 51 by means of which the sleeves 49 are rigidly secured in their assembled positions.

Slidably received in each of the guiding sleeves 49 is a gripper element 52, which is substantially in the form of a short cylindrical bar, having a serrated end piece 53 at its inner end which is adapted to be moved into and out of gripping contact with the outer surface of a billet 26. One side of each of the gripping elements 52 is recessed to receive a short rack member 54 which is engaged with a small pinion gear 55 journaled in the sleeve-like guide member 49. The pinion 55 of each gripper assembly is carried by a small transversely extending shaft 56 which in turn mounts a second small pinion gear 57. The last mentioned pinion gear 57 is located at one side of the gripper assembly and is engaged with the large ring gear 38.

Thus, as will be observed in Figure 10, for example, when the ring gear 38 is rotated through a relatively small arc, the small pinions 57 and 56 are caused to rotate, which in turn causes the gripper elements 52 to be moved inwardly or outwardly, depending upon the direction of rotation of the ring gear. Each of the ring gears 38, 38a and 38b engages three pinions and is thereby adapted to effect the simultaneous clamping or retracting movement of a complete set of three gripper elements 52.

When a billet 26 is positioned properly within the chuck housing 13 the three clamping cylinders 43 are simultaneously energized so that the several ring gears 38—38b are rotated in a counterclockwise direction (as viewed in Figure 10). Each set of three gripping elements 52 is thereby brought into firm contact with the outer surface of the billet 26 to rigidly clamp the same in concentric relation to the housing 13 so that a coring operation may be carried out in the desired manner.

It will be understood, of course, that the gripper elements 52 need be actuated through a relatively small distance in moving between clamping to releasing positions. Therefore, the actuating cylinders 43 may be of relatively short stroke so that the clamping and releasing operations may be carried out in a minimum of time without special control instrumentalities. Thus, to enable the apparatus to accommodate billets of from twelve to twenty-six inches in diameter, for example, the pins 41 which connect actuating cylinders 43 with the driving arms 39 for the various ring gears 38—38b are readily removable. The pins 41 may be placed in any of the plurality of circumferentially spaced apertures 40 so that the initial rotary orientation of the ring gears may be altered.

Having specific reference to Figure 10, in order to accommodate billets of the largest size the pins 41 would be positioned in the lowermost ones of the apertures 40 so that when the piston rods 42 of cylinders 43 were extended the various gripping elements 52 would be retracted to their outermost positions. Upon a reverse actuation of the cylinders 43 the gripping elements 52 would move inwardly a limited distance, sufficient, however, to move into gripping relation with a large size billet.

It will be understood that while there are three sets axially spaced of gripper assemblies employed in the illustrated apparatus only two of the sets will be actuated at one time. Thus, where billets of short axial length are to be handled the first two sets of gripper assemblies will be operated, one set to grip the forward end of the billet and another set to grip the rearward end. In the case of billets of greater axial length the first and third sets of gripper assemblies will be operated, again to grip the opposite end portions of the billet.

During coring operations it is contemplated that the cutter 24 and workpiece 26 will be provided with a continuous flow of cutting oil or fluid which acts to cool the workpiece and tool, as well as to carry away the chips resulting from the cutting operation. To prevent such fluid and the chips and other foreign matter therein from fouling the chucking mechanism and other parts of the apparatus I provide a sheet metal liner 123, which is generally cylindrical, and which is inserted in the interior of the chuck housing 13, substantially in the manner shown in Figure 10. Suitable openings are provided about the wall of the liner member 123 so that the chucking elements 52 may be projected interiorly thereof. The fluid and chips which flow out of the core opening are collected at the bottom of the liner 123 and discharged at the forward end of the housing.

Below the housing 13, between the foundation tracks 11 and 12, there are provided inclined deflector plates 124 and 125 which receive the discharged fluid and direct it into a receiver 126 therefore, which is located in a pit 127 below the machine foundation. The container or receiver 126 is of a conventional design, having means to retain the chips therein while permitting the fluid to drain out for reuse. When the container 126 is full of chips it may be shifted to the side, as shown in Figure 3, and removed.

At the right hand end of the foundation 10, immediately beyond the right hand traverse limit position of the chuck housing 13, there is provided an adjustable billet support designated generally by the reference numeral 58 which comprises a plurality of longitudinally spaced opposed pairs of anti-friction rollers 59. The first or outer portion of the support comprises a plurality of spaced roller supports 60, as shown in Figure 6, each of which journals a pair of downwardly inclined rollers 59, there being opposed sets of roller supports 60 defining an elongated longitudinally disposed trough-like support for the cylindrical billets 26.

Figure 5:
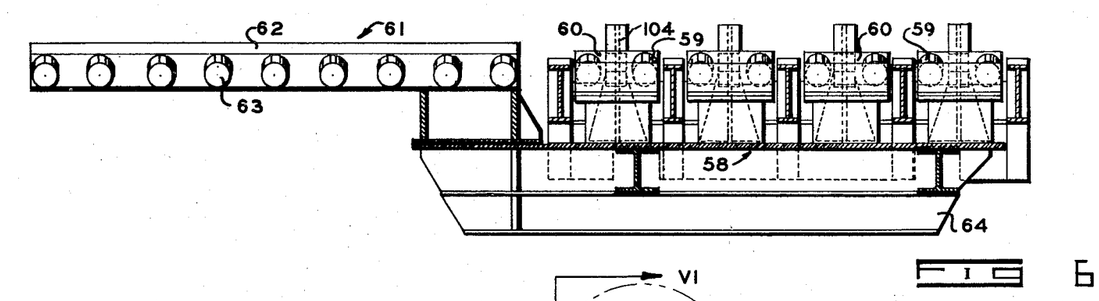
Figure 5 is a side elevation of the loading and unloading mechanism illustrated in Figure 4.
Figure 7:
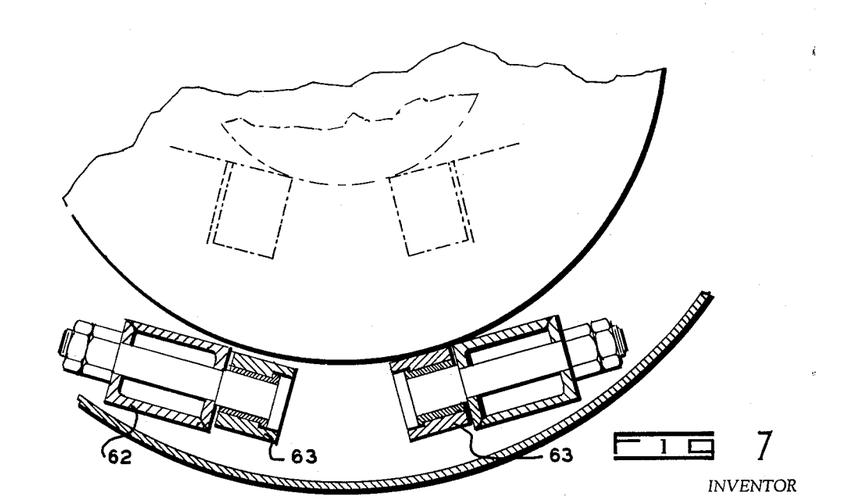
Figure 7 is an enlarged section view taken generally along lines VII—VII of Figure 5.
Figure 9:
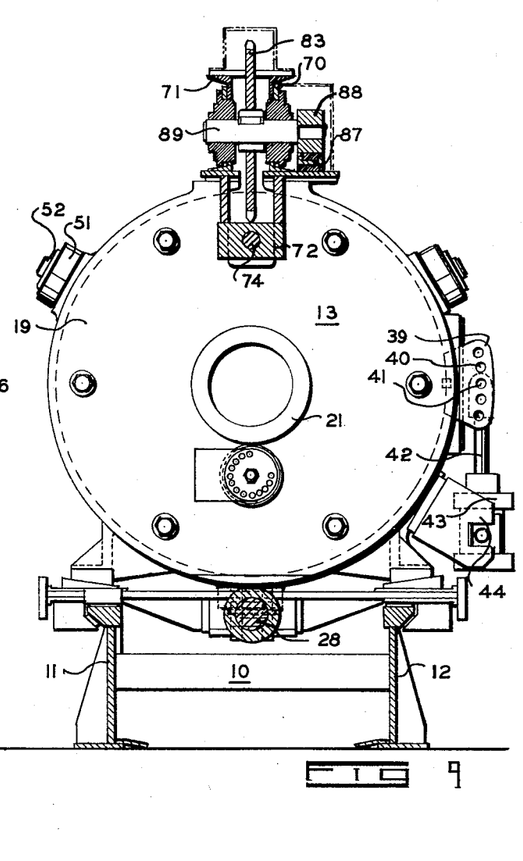
Figure 9 is an enlarged section view taken generally along line IX—IX of Figure 1, illustrating one end of the chuck housing of Figure 8.

In accordance with the teachings of the invention the support 58 is provided at its forward end with a cantilever-like extension 61, comprised of a pair of spaced forwardly extending cantilever beams 62, journaling a plurality of downwardly inclined billet supporting rollers 63. As illustrated in Figures 5–7, the forward portion 61 of the billet support is of narrow cross section, and is adapted to be inserted longitudinally within the interior of the chuck housing, or, more accurately, to be received within the chuck housing as the same is moved into its right hand limit position along the foundation 10. In this manner billets which are positioned upon the outer portion of the support 58 may be easily transferred in a longitudinal direction into the interior of the housing, in position to be gripped by the chucking elements 52.

As will be understood, in order for the billets to be properly engaged within the chuck housing the billets must first be substantially aligned with the central longitudinal axis of the housing. To this end I have provided a rigid supporting framework for the billet support 58 which is comprised of a plurality of channels 64 or other structural members. This framework is mounted upon a plurality of screw jacks 65. The jacks 65 are mechanically interconnected by means of a shaft 66 and chains 67, the shaft 66 being connected to a suitable hand adjusting wheel 69 so that the entire supporting platform for the billets may be easily raised or lowered to accommodate billets of various sizes within the coring machine.

In order to transfer a billet positioned upon the outer portion of the work support 58 into the interior of the chuck housing, and to subsequently withdraw the billet following a coring operation, I have provided a novel transfer apparatus which is best illustrated in Figures 1, 8, 9 and 14. As indicated in the said figures, there is rigidly mounted at the top of the chuck housing 13 a pair of spaced outwardly turned channel members 70 and 71 which extend substantially beyond the housing 13 in a rearwardly direction. The arrangement is such, in accordance with the teachings of the invention, that the rearwardly extending portions of the channels 70 and 71 overlie the whole or substantially the whole of the billet supporting platform 58 when the chuck housing 13 is in its retracted or loading position at the right of its traverse.

Mounted upon the beams 70 and 71, in underslung relation thereto, by means of depending brackets 72 and 73 at each end thereof, is an elongated guide rod 74. The guide rod 74 extends substantially from one end to the other of the beams 70 and 71 and passes through the interior of the chuck housing, as illustrated in Figure 10.

Slidably received upon the guide rod 74 are spaced downwardly depending billet engaging dogs 75 and 76. The dog 76 (as well as the opposing dog 75), illustrated in more detail in Figure 14, comprises a body member or block 77 which is bored to receive the guide rod 74 and which is provided with a flat front surface 78 extending downwardly from the guide rod 74 and adapted to engage the upper front face portion of a billet of maximum or near maximum diameter. The body block 77 is also provided with a vertical groove in one side thereof which is adapted to slidably receive an L-shaped extension member 79 which has a front surface 80 substantially flush with the front surface 78 of the body block. A bolt 81 adjustably secures the extension member 79 to the body block 77, and, as will be understood, where small diameter billets are to be accommodated the extension member 79 is merely lowered to a correct height so that the end face of the billet is engaged, while at the same time there is ample clearance for the milling cutter 24 to pass through the billet without engaging the transfer dogs.

Figure 14:
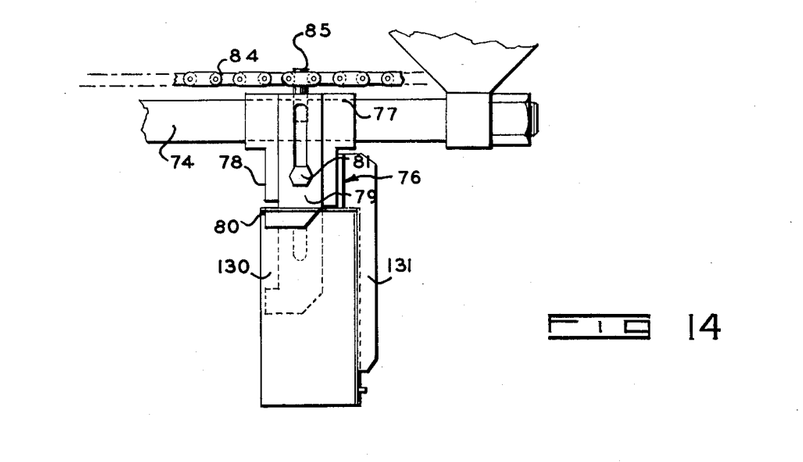
Figure 14 is an enlarged fragmentary view of billet loading means used in connection with the apparatus of my invention.

Journaled by the longitudinally extending beams 70 and 71, adjacent each end thereof, are sprocket wheels 82 and 83, about which is entrained an endless chain 84. The sprocket wheels 82 and 83 are so positioned on the beams 70 and 71 that the lower reach of the chain 84 passes through the housing 13 and slightly above the billet transfer dogs 75 and 76, as illustrated by Figures 1 and 14.

The dogs 75 and 76 are attached to the chain 84 so that upon appropriate movement thereof the dogs will be carried into or out of the chuck housing 13 to effect the transfer of billets in the desired manner.

Since it is contemplated that billets of various lengths as well as various diameters will be accommodated in the illustrated coring machine I have provided for the removable and adjustable attachment of the transfer dogs 75 and 76 to the chain 84. Any convenient arrangement may be provided for so attaching the transfer dogs, although for purposes of illustration I have shown in Figure 14 a pin 85 which is passed through the links of the chain 84 and received in the body block of the transfer dog so that the latter is carried along with the chain. To change the position of the dogs, to place the same closer together, for example, the chain 84 is raised above the pin 85 of one or both dogs, and the latter are moved to a different point on the chain.

Rigidly secured to and extending below the body member 77 is a reversed L-shaped member 131 as shown in detail in the enlarged view of the dog assembly in Figure 14. The member 131 may be welded or held by some other means, not specifically shown, to the body block 77 so that a clearance between the longer arm of the L-shaped member 131 and the working face 80 of the dog assembly 76 is formed. Mounted inwardly on the longer arm of 131 is the hollow wing-shaped splash guard 130 that substantially covers the rear end of the billet being moved into the housing 13 proper for engagement by the various chuck assemblies in preparation for the coring operation. It is seen in Figure 3 that the splash guard is adapted to be moved within the confines of the opening in the cylindrical assembly 13 without catching or becoming lodged on the sides thereof. A cutaway portion is provided so that the dog assembly 76 may be extended to the lowest position for use with billets of relatively small diameter. It is also contemplated that detachable extension splash guards may be employed to increase the covering area of the guards for smaller diameter billets.

This assembly of the member 131 and the arched splash guard 130 serves a two-fold purpose. The first advantage of this arrangement is that the work-face 80 of the dog assembly 76 is augmented as the face of the splash guard 130 may come in contact with the end of the billet being worked and therefore insure a better distribution of pressure over its face thus making it easier to move. The second utilization of the splash guard 130 is that it prohibits the objectionable splashing and throwing of cooling liquid and metal chips out the end opening in the assembly 13 and also helps to retain the heat in the billet if it is preheated before coring operations are started.

In order to actuate the transfer chain 84 at proper times there is provided a relatively long stroke hydraulic actuator 86 which is mounted on the beam 70 above the chuck housing 13. Connected to the operating rod of the actuator 86 is a rack 87 (see Figure 9) which engages with a small pinion gear 88. The pinion 88 is keyed to a shaft 89, which in turn is keyed to the forwardmost one of the chain driving sprockets 82. The arrangement is such that upon appropriate energization of the actuator 86 the sprocket 82 is rotated to move the lower reach of the chain in a forwardly direction whereby the billet is engaged by the outer dog 76 and carried into the interior of the housing 13, in position to be gripped by the chucking elements 52.

To position the billets within the chuck housing 13, in desired relation to the chucking elements 52 and cutter 24 there is provided at the forward end of the housing 13 an abutment stop device generally indicated by the numeral 90 (see Figure 12). The stop device 90 comprises a billet engaging arm 91 carried at the end of a support 92 which is slidably received in the forward end wall of the housing 13. On the outer face of the end wall 19 there is secured a cup-like member 93 in which is received a compressible coil spring 94. The spring 94 acts outwardly against the outer wall of the cup-like member 93 and inwardly against the support 92 so that the support and billet engaging arm 91 are urged in a rearwardly direction.

When a billet is moved into the housing 13 the forward end of the billet engages the arm 91, causing the latter and its support 92 to retract against the action of the spring 94. To limit this retracting movement the support 92 is provided with an enlarged shoulder portion 95 which is adapted to engage the inner surface of the housing front wall 19.

At the forward end of the slidable support 92 there is mounted a disc-like plate 96, to be further described, which is carried with the support 92 and which is arranged, upon forward movement thereof, to trip the operating arm of a suitable limit switch 97. Actuation of the switch 97 causes a corresponding actuation of a solenoid operated valve 98 (Figure 15) so that the supply of fluid to the transfer chain actuating cylinder 86 is stopped, bringing the billet to rest in a desired position.

As will be readily understood, the billet engaging arm 91 of the stop assembly 90 must be readily adjustable so that only the outer edge portion of a billet of any size is engaged, providing clearance for the subsequent advance of the milling cutter 24. To this end I have provided a novel adjusting arrangement in which the billet engaging arm 91 is provided with an outer contour much in the nature of an involute. It will be observed in Figure 13 that the involute-like contour of the arm 91 is generated about the rod-like arm support 92, extending over an angular area in the order of two hundred fifty degrees.

Thus, the supporting rod or member 92 may be rotated with respect to the housing 13 so that substantially the whole of the involute-like contour of the arm is turned away from the cutter 24. In such position, the arm 91 engages the end of the largest billets only, while clearing the largest cutters. And as billets of decreasing size are accommodated within the housing 13 the rotary position of the arm is altered so that larger radiused portions of the arm extend radially inwardly toward the billet. In each case, however, the rotary positioning of the arm 91 is such that only the outer edge portion of the billet is engaged, providing clearance for the cutter then being employed.

To facilitate the adjustable positioning of the billet engaging arm 91 the outer disc 96, which is carried at the outer end of the supporting rod 92, is provided with a plurality of circumferentially spaced apertures 99 which are adapted to slidably receive a bolt 100. The bolt 100 is threaded at its end portion for reception in the end plate portion of the cup-shaped member 93. Thus, in order to alter the adjusted position of the arm 91 the bolt 100 is withdrawn, permitting free rotation of the disc 96 to a desired position, following which the bolt 100 is again replaced to lock the arm in the thus adjusted position. As will be observed in Figure 12, the free portion of the bolt 100 is sufficiently long to enable the disc 96 to reciprocate slightly to effect the actuation of limit switch 97.

Figure 4:
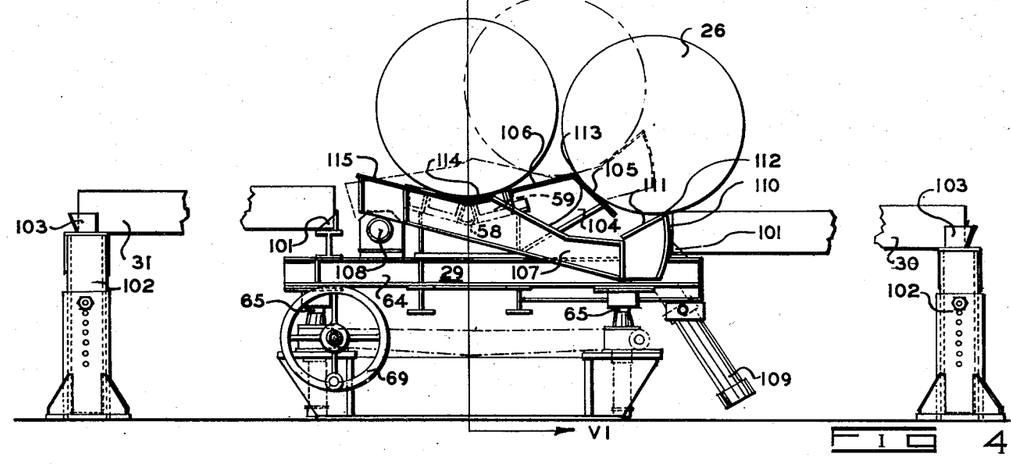
Figure 4 is an enlarged end elevation of the installation of Figure 1, illustrating primarily my improved mechanism for loading billets transversely into axial alignment with the coring cutters, and for transversely unloading billets from such position onto a storage rack.

Referring now to Figures 3 and 4, there is illustrated a novel apparatus for transferring billets to and from the coring apparatus in a rapid and expeditious manner. Thus, at the right hand side of the billet support 29 there are provided spaced supporting pockets 101 which are adapted to receive the inner end portion of a storage pallet 30 which may be of more or less conventional design, having means facilitating the engagement thereof by a fork truck or other conveyor device, not shown, for transporting the same from place to place.

Spaced outwardly of the billet support 29 are adjustable supports 102 having pockets 103 at the upper ends thereof to receive the outer end of the pallet 30. The supports 102 are adjustable so that regardless of the adjusted position of the billet support 29 the outer end of the pallet 30 may be raised slightly higher than the inner end so that the billets 26 supported thereon tend to roll inwardly toward the machine.

Rigidly mounted on the billet support 29, slightly inwardly of and above the innermost end of the pallet 30 are a plurality of spaced billet skids 104, which are provided with outwardly facing inclined surfaces 105 which are arranged to engage the side portion of billets tending to roll inwardly off of the pallet 30, the surfaces 105 acting in one capacity as abutment stops to retain a billet in readiness for loading, substantially in the manner indicated in Figure 4.

Adjoining the outwardly facing inclined skid surface 105 is an inwardly facing inclined skid surface 106 which extends inwardly to the trough-like supporting cradle defined by the plurality of anti-friction rollers 59. The inwardly facing surface 106 is substantially parallel with the axes of the rollers 59 and is substantially tangent to the upper surface portions thereof so that a billet 26 may be easily rolled down the inclined surface and into supported position upon the rollers 59.

Positioned between the several skids 104 are lifting arms 107 which are pivoted at 108, at the opposite side of the support 29 from the pallet 30. These arms 107 are normally maintained in a retracted position below the level of the upper surface of the pallet 30, while being movable to a position substantially above such level by means of a long stroke hydraulic actuator or cylinder 109.

At its outer end extremity each of the lifting arms 107 is provided with an arcuate surface 110 which acts, when the arm is in an upraised position, as an abutment stop to prevent billets from rolling off of the pallet 30. Adjoining the arcuate surface portion is an inwardly facing sharply inclined surface 111 which, together with the arcuate surface 110, defines a pointed support area 112 which normally lies below a billet 26 resting against the inclined abutment surfaces 105, the support area 112 lying slightly outwardly of the center of gravity of such billet, as indicated in Figure 4. The arrangement is such that when the cylinder 109 is actuated to raise the arms 107 the billet above the arm is caused to roll or skid upwardly and inwardly along the skid surfaces 105 until eventually it clears the upper edge of such surfaces and starts to roll down the adjoining inwardly facing surfaces 106.

In order to prevent the thus raised billet from rolling directly down the inclined surfaces 106 each arm 107 is provided with an upwardly and outwardly facing inclined surface 113 which, when the arm 107 is in an upraised position, retains a slight outwardly facing inclination. The surfaces 113 intersect with the inwardly facing surfaces 106 of the fixed skid members 104 so that a cradle-like support is defined, retaining the billet substantially in the position indicated by broken lines in Figure 4. Immediately thereafter, when the cylinder 109 is caused to retract, the line of intersection between the planes defined by surfaces 106 and 113 is slowly and controllably caused to recede downwardly along the fixed surface 106, permitting the billet 26 to roll slowly down the incline until it reaches the troughed supporting rollers 59, at which time the billet is properly aligned with the chuck housing 13, in readiness for axial transfer into the interior thereof.

For the purpose of discharging the billets 26 after a coring operation the inner portion of each of the lifting arms 107 is provided with a short inwardly facing inclined surface 114 and an oppositely inclined surface 115. These last mentioned surfaces form a trough-like support which is complementary with the supporting surfaces of the anti-friction rollers 59, being normally located slightly below the rollers 59, however.

When the arms 107 are raised, to load a billet onto the support 29 in the manner before described, a billet theretofore supported on the rollers 59 is lifted in the trough-like formation defined by the surfaces 114 and 115. As the arms 107 reach the top of their lift, however, the surfaces 115, which are normally inclined inwardly, toward the central axis of the machine, become tilted outwardly so that the finished billet is caused to roll to the left, off of the billet supporting platform 29.

At the left hand side of the supporting platform 29 there is provided a receiving pallet 31 which is supported in a manner similar to the first described pallet 30 and which is arranged to receive the finished billets as the same are caused to roll off of the lifting arms 107.

Preferably, the pallet 31 is so disposed on its adjustable supports as to be slightly inclined in an outwardly direction. In this manner the finished billets are caused to roll to the outer end of the pallet 31, facilitating the proper loading of the pallet for subsequent transportation to an extrusion press or other station.

As will be observed in Figure 2, my loading and transfer arrangement is adapted to accommodate relatively long billets which are stored in side-by-side relation on the pallet 30, or smaller billets which may be stored in side-by-side pairs. In the latter case the billets may be handled one row at a time, with the billet transfer dogs 75 and 76 being appropriately adjusted so as to be aligned with the row being transferred. It will be assumed, of course, that all billets on any single pallet will be of the same size, at least nominally, this being the most efficient operating procedure.

In general summary, my apparatus is prepared for operation by first adjusting the height of the billet supporting platform 29, and the pallet supports 102 to conform to the diameter of the billets to be machined. Similarly, a cutter 24 is selected which is properly related to the diameter of the billet. And the billet stop is rotated to a position wherein the radially innermost portion thereof contacts the edge of the billet, while clearing the milling cutter.

This being done, the pallets 30 and 31 are moved into operative positions in their supporting pockets 101 and 103 by means of a fork lift, for example, or other convenient conveyance. The first pallet 30 is, of course, loaded with unfinished billets which, after the pallet 30 is properly positioned, are permitted to roll down against the abutment stop surface 105.

When the machine operator is ready to load a billet on to the machine the cylinder 109 is actuated to raise and subsequently lower the lifting arm 107 whereby a billet is gently rolled into position upon the anti-friction rollers 59. The billet, at this time, is positioned between the transfer dogs 75 and 76, assuming the latter to have been properly adjusted initially.

The billet 26 is now aligned with the central axis of the chuck housing 13, and the transfer cylinder is actuated, causing the transfer chain 84 to move in a feeding direction. The outer dog 76 engages the outer end surface of the billet, moving the same along the rollers 59, of the front billet support, and onto the rollers 63 of the forwardly extending cantilever support 61. The billet continues to move in a forwardly or feeding direction until the forward end thereon engages the involute-like stop arm 91, at which time the limit switch 97 is opened, deenergizing solenoid valve 98 and causing it to assume a neutral position wherein its outlet ports are closed off from the fluid source.

Figure 15:
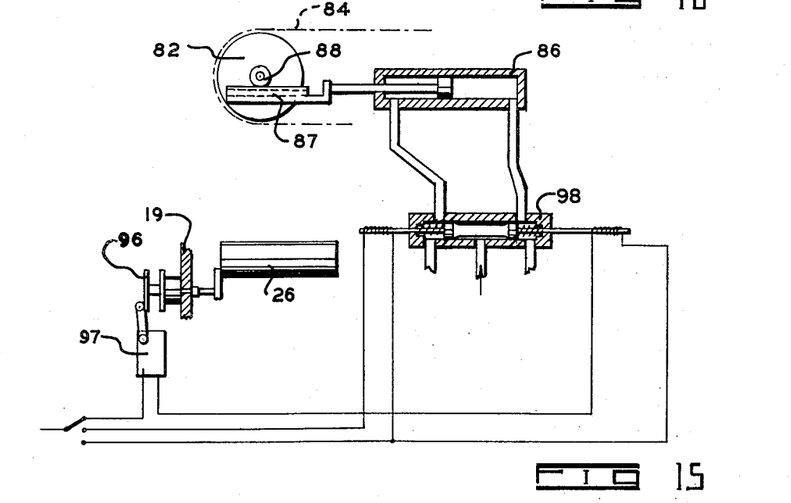
Figures 15 and 16 are simplified schematic representations of certain control arrangements employed in connection with the operation of the apparatus of Figure 1.
Figure 16:
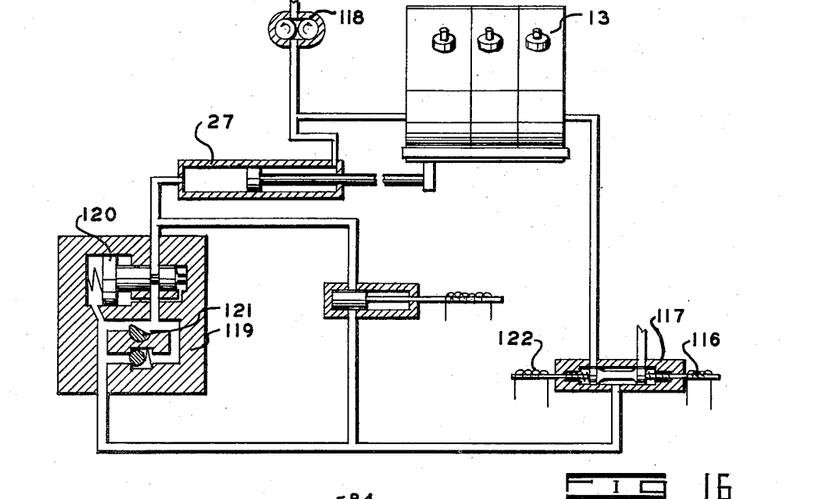

It should be observed in Figure 15 that when the control valve 96 for the transfer cylinder 86 is in a deenergized or neutral position both parts leading to the cylinder 86 are connected to exhaust. This is an important feature since when the cutter 24 first moves into contact with the billet 26 the latter may slip slightly in the gripper elements 52 until gripping contact is firmly established.

When the billet 26 is properly positioned, axially, within the chuck housing 13 two of the clamping cylinders 43 are simultaneously actuated to bring selected of the sets of clamping or chucking elements 52 into firm gripping contact with the outer surface of the billet.

With the billet thus properly clamped and located, the main feed cylinder 27 is actuated to move the chuck housing 13 controllably in the direction of the rotating cutter element 24 to effect the desired coring operation. Feed cylinder 27 is actuated by energizing a coil 116 of a solenoid valve 117. This opens the head end of the feed cylinder 27 to exhaust, so that the operating pressure from pump 118 becomes effective to actuate the cylinder.

It is one of the important features of this invention that the chuck housing 13 is drawn smoothly and at a constant rate in the direction of the cutter 24 throughout the whole of the coring operation, notwithstanding that variation in material hardness or occasional voids may be encountered. To this end I have provided a constant flow valve 119 which has a compensating valve plunger 120 therein which is normally biased in a direction tending to maintain an open passage through the valve. On the outlet side of the valve plunger 120 there is provided a metering valve 121 which is adjustable so that an orifice of predetermined size is provided through which the hydraulic fluid exhausting from the head end of the feed cylinder must pass.

Between the plunger 120 and the metering valve 121 there are fluid passages leading to the right side of the plunger, while on the outlet side of the metering valve 121 there is a passage leading to the left side of the plunger. When oil flows through the valve 119 there is a pressure drop through the metering valve 121 so that there is a greater fluid pressure acting on the right side of the plunger than on the left side. This pressure differential is partially compensated by the spring biasing of the plunger toward the right. However, if the flow through the valve tends to exceed a predetermined amount, as determined by the setting of the metering valve 121, the plunger 120 moves to the left to restrict the valve passage. In this manner the flow through the valve 119 is substantially constant, regardless of pressure and load variations at the cylinder 27.

When the coring operation is complete valve 117 is reversely actuated, through an operating coil 122, so that fluid pressure is applied simultaneously to both ends of the main feed cylinder 27. By virtue of the differential in effective areas between the head and rod ends of the cylinder the piston thereof moves to the right to return the chuck housing 13 to its outer position.

At this time the chucking elements 52 are retracted, the transfer cylinder 86 is reversely actuated to cause the billet 26 to be withdrawn from the chuck housing 13 on the anti-friction rollers 59 and 63. The finished billet is then resting on the outer support 29 therefor, directly over the lifting arms 107. When these arms are raised, by actuation of cylinder 109, the finished billet is rolled off onto the exit side storage pallet 31 while simultaneously a new billet is fed into loading position from the entry side pallet 30.

It should now be apparent that I have accomplished the several objects initially set forth. I have provided a basically new type of metal working machine which finds useful application in the coring of aluminum billets, for example, prior to the extrusion thereof.

One of the broadly new and highly advantageous features of the invention is the provision of a coring machine having an elongated foundation with generally fixed loading and cutter means at opposite ends thereof and a billet gripping or chucking housing reciprocably movable between such loading and cutter means. In this manner the massive cutter apparatus, including the drive motor and transmission mechanism therefor, may be rigidly mounted on the foundation, while the much lighter chuck housing is slidably supported. This has several important advantages: In one respect, the foundation may be of substantially lighter construction since the heavy components need not be movably supported. In another respect, superior cutting accuracy is afforded by virtue of the rigid mounting of the cutter supporting means. This last feature is of substantial importance in the coring of aluminum and other non-ferrous metals since there is a general tendency for cutters to seize or bind during the cutting operation.

Another important feature of the invention, which is of particular advantage in the machining of cast aluminum billets is the provision of means to feed the chuck housing toward the cutter device at a uniform rate, without regard to changes in cutter resistance due to the encountering of voids and soft or hard spots in the billets. The feeder drive is such that the chuck housing cannot jerk ahead, for example, if a void is met during the coring operation. As a result, the cored opening is straighter and more closely held to dimension tolerances.

Another novel and advantageous feature of the invention resides in my chuck housing assembly 13. There are provided a plurality of chucking sections, each comprising three radially movable chucking elements which grip a billet at spaced points about its periphery. The housing assembly is comprised of a plurality of such sections which are interfitted in an axially stacked arrangement, each with its separate and independent but simultaneously controlled actuator. Each of the sections therefore clamps the billet independently so that variations in billet diameter over its length are inconsequential. The overall design of the chuck housing is such that any number of chucking sections may be readily assembled, depending upon the intended capacity of the machine. The manner of assembly is such, moreover, that upon assembly of one section with another an annular groove is formed for the reception of a rotary chuck actuating ring gear. The entire arrangement is one of complete simplicity and wide versatility.

For transferring the billets to and from the chuck housing I have provided a novel loading and transfer apparatus which includes a vertically adjustable cantilever type anti-frictional support which extends internally of the chuck housing to permit the free movement to billets thereinto. The support is readily adjustable so that regardless of the diameter of the billet its central axis will substantially coincide with that of the chuck housing and cutter axis.

For effecting the actual movement of the billets into the chuck housing I have provided a novel transfer chain arrangement which is carried at all times with the chuck housing and which has readily adjustable dogs for engaging billets of any size and moving the same along the anti-frictional support therefor.

Inward feeding movement of the billets is always accurately controlled by means of an involute-like stop member which may be rotatably adjusted so as to engage the edge portion only of the end wall of a billet of any size. The stop member actuates a limit switch to assure the desired positioning of the billet; and in all cases the stop member is clear of the path of the cutter wheel which cores the billet.

Another important feature of novelty resides in the billet loading and unloading arrangement which acts in conjunction with entry side and exit side billet storing pallets to provide a continuous supply of billets on the main billet support, simultaneously discharging a billet from one side of the machine and moving an unfinished billet into position for transfer into the interior of the chuck housing. This loading mechanism is particularly characterized by a novel arrangement of billet supporting surface portions on fixed skid members and on movable billet lifting arms. The arrangement is such that large size billets of substantial bulk and mass are handled in a gentle, yet positive and accurate manner.

It should be immediately apparent that the specific embodiment herein disclosed is intended to be representative only, as many changes may be made therein without departing from the clear teachings of the invention. Reference should therefore be made to the following appended claims in determining the full scope of the invention.

I claim:

1. In a machine for coring aluminum billets and the like the combination of a base, a drive mechanism mounted at one end of said base, an elongated cutter supporting shaft extending outwardly of said drive mechanism along the longitudinal axis of said base and mounting a cutter at its outer end, a chuck housing mounted on said foundation outwardly of said drive mechanism and adapted for slidable movement therealong toward and away from said drive mechanism, means in said chuck housing to grip a workpiece, means mounted in fixed relation to said base for forcibly and controllably moving said housing in the direction of said drive mechanism, and means for loading workpieces into said chuck housing positioned on said base outwardly of said chuck housing.

2. Apparatus according to claim 1 further characterized by said means for forcibly and controllably moving said housing comprising a hydraulic actuator, and a control system therefor including a constant fluid flow valve.

3. Apparatus according to claim 1 further characterized by said chuck housing having a front wall portion facing said drive mechanism, said front wall portion having a central opening therein, and bushing means in said opening having slidable and rotary supporting engagement with said cutter supporting shaft whereby to guide and support the same outwardly of said drive mechanism during cutting operations:

4. Apparatus according to claim 3 further characterized by said drive mechanism having means to mount cutter supporting shafts of various diameters, and said bushing means being readily replaceable to accommodate varied shafts.

5. In a machine for coring aluminum billets and the like the combination of a base, a drive mechanism mounted at one end of said base, an elongated cutter supporting shaft extending outwardly of said drive mechanism along the longiudinal axis of said base and mounting a cutter adjacent its outer end, a chuck housing mounted on said base outwardly of said drive mechanism and adapted for movement therealong toward and away from said drive mechanism, means in said chuck housing to grip a workpiece, means to motivate said chuck housing along said base, and means at the other end of said base for loading workpieces into said housing, said housing having an open end portion opposite said drive mechanism for receiving workpieces.

6. In a coring machine or the like of the kind having a cutter, a chuck housing for gripping workpieces, and means to move said chuck housing and cutter together to effect a cutting operation; the improvement in said chuck housing comprising a hollow axially extending body, a plurality of workpiece gripping assemblies mounted on said body, each such gripping assembly comprising a radially disposed cylindrical sleeve-like guide member mounted on said body, a rod-like chucking element received in the guide member and movable radially inwardly and outwardly of the body, said chucking element having a rack portion on one side thereof, and a pinion journaled on said body and engaging said rack portion, a large ring gear rotatably received with said body and engaging the pinion of each gripping assembly, and power means to rotate said ring gear through a small arc to effect clamping and releasing movements of said chucking elements.

7. Apparatus according to claim 6 further characterized by said power means including a short stroke fluid cylinder, and further including adjustable means interconnecting said fluid cylinder and said ring gear providing for the accommodation of workpieces of widely varying sizes.

8. In a coring machine or the like of the kind having cutter means, an axially elongated chuck housing for gripping the workpieces, means to move said chuck housing and cutter axially together to effect a cutting operation, and means to load workpieces axially into said chuck housing; the improvement in said means to load comprising a workpiece support positioned normally outwardly of one end of and longitudinally with respect to said chuck housing and having a plurality of anti-friction rollers thereon for supporting a workpiece, a cantilever-like extension member mounted in fixed relation to said workpiece support and having a plurality of anti-friction rollers thereon, said cantilever-like extension being receivable within the interior of said chuck housing to movably support a workpiece therein prior to the latter being gripped within the chuck housing.

9. Apparatus according to claim 8 further characterized by said workpiece support and extension member being vertically adjustable as a unit whereby workpieces of various sizes may be axially aligned with said cutter means.

10. Apparatus according to claim 8 further characterized by said chuck housing being axially movable with respect to said workpiece support and extension member during a cutting operation.

11. Apparatus according to claim 10 further characterized by said chuck housing having a plurality of axially and circumferentially spaced radially movable chucking elements therein adapted to engage the outer surface of a workpiece positioned in said chuck housing, said cantilever-like member being of narrow transverse cross section and being relatively reciprocably movable between axial rows of chucking elements.

12. In a coring machine or the like the combination of rotatable but otherwise fixed cutter means, an axially elongated chuck housing for gripping cylindrical workpieces, means to move said chuck housing toward said cutter means to effect a cutting operation, said chuck housing having a plurality of axially and circumferentially spaced chucking elements adapted for radial movement in said chuck housing to grip the outer surface of a cylindrical workpiece, said chucking elements being arranged in axial rows, and generally fixed billet supporting means comprising a cantilever-like member fixedly mounted at one end outwardly of said chuck housing and being receivable within the interior of said chuck housing to support a workpiece therein during loading and unloading operations.

13. Apparatus according to claim 12 further characterized by said cantilever-like member comprising a pair of longitudinally spaced cantilever beams, each of said beams having a plurality of spaced anti-friction rollers thereon, said rollers being tilted inwardly of the central axis of said chuck housing whereby to define a trough-like support for a workpiece positioned therein.

14. In a coring machine or the like of the kind having cutter means, an axially elongated chuck housing for gripping the workpieces, means to move said chuck housing and cutter axially together to effect a cutting operation, and means to load workpieces axially into said chuck housing; the improvement in said means to load comprising a work support having a first portion located outwardly of one end of said housing and a second portion adapted to be received internally of said housing, a transfer chain extending generally over said chuck housing and outwardly of said one end thereof, the lower reach of said chain extending through said chuck housing, spaced billet engaging dogs extending downwardly from said chain and adapted to engage the opposite end surface portions of a workpiece positioned on said support, and means to move said chain whereby to carry a workpiece into or out of said chuck housing.

15. In a coring machine or the like of the kind having cutter means, an axially elongated chuck housing for gripping the workpieces, means to move said chuck housing and cutter axially together to effect a cutting operation, and means to load workpieces axially into said chuck housing; the improvement in said means to load comprising a work support having a first portion located outwardly of one end of said housing and a second portion adapted to be received internally of said housing, a slide member supported in generally fixed relation to said chuck housing and having a first portion extending outwardly of said one end of said housing over the first portion of said work support and a second portion extending internally of said chuck housing, a downwardly extending dog movably supported on said slide member and adapted to engage an end surface of a workpiece, and means to move said dog along said slide member to move a workpiece from said first portion to said second portion of said work support while said second portion of said work support is received internally of said chuck housing.

16. In a coring machine or the like the combination of rotatable but otherwise fixed cutter means, an axially elongated chuck housing for gripping workpieces, means to move said chuck housing toward said cutter means to effect a cutting operation, a generally fixed workpiece support having a first portion positioned outwardly of one end of said chuck housing and a second portion adapted to be received internally of said chuck housing when the latter is positioned in retracted relation to said cutter means, and means carried by said chuck housing and movable therewith for engaging a billet on said first portion of said work support and drawing the same into said chuck housing.

17. Apparatus according to claim 16 further characterized by said means carried by said chuck housing comprising an elongated beam secured to the upper portion of said chuck housing, a slide member supported at its ends by said beam and extending through said chuck housing and outwardly of the said one end thereof, and workpiece engaging dogs carried movably on said slide member and movable from a first position outwardly of said chuck housing to a second position internally thereof to load a workpiece into said machine.

18. Apparatus according to claim 16 further characterized by said means carried by said chuck housing comprising a pair of spaced workpiece engaging dogs movable from a position outwardly of said one end of said chuck housing to a second position internally thereof, drive means connecting said dogs, and means to adjustably position said dogs on said drive means to accommodate billets of various sizes.

19. Apparatus according to claim 16 further characterized by said means carried by said chuck housing comprising an elongated beam secured to the upper portion of said chuck housing, sprocket wheels carried by said beam at each end thereof, one of said sprocket wheels being positioned substantially outwardly of said one end of said chuck housing, a transfer chain entrained about said sprockets and having a portion extending through said housing, and workpiece engaging means carried on said chain.

20. Apparatus according to claim 19 further including a slide member supported at its ends by said beam and extending through said chuck housing, said workpiece engaging means being slidably supported on said slide member and being drivingly engaged with said chain.

21. In a coring machine or the like of the kind having cutter means, an axially elongated chuck housing for gripping the workpieces, means to move said chuck housing and cutter axially together to effect a cutting operation, and means to load workpieces axially into said chuck housing; the improvement in said means to load comprising a work support extending into said chuck housing, means to move a workpiece axially along said support and into said chuck housing, and an involute-like stop member mounted within said chuck housing and adapted to engage the leading end of said workpiece to limit the inward movement thereof, said stop member being rotatable into a plurality of adjusted positions whereby the outer edge portion only of the workpiece is engaged.

22. In a coring machine or the like of the kind having cutter means, an axially elongated chuck housing for gripping the workpieces, means to move said chuck housing and cutter axially together to effect a cutting operation, and means to load workpieces axially into said chuck housing; the improvement in said means to load comprising means to move a workpiece axially into said chuck housing, and an involute-like stop member mounted within said chuck housing and adapted to engage the leading end of said workpiece to limit the inward movement thereof, said stop member being rotatable into a plurality of adjusted positions whereby the outer edge portion only of the workpiece is engaged.

23. Apparatus according to claim 22 further characterized by said means to move including a workpiece support, means to raise and lower said support to axially align workpieces of various sizes within said chuck housing, said involute-like stop member being rotatably mounted along an axis offset from the principal axis of said chuck housing.

24. Apparatus according to claim 22 further characterized by said stop member comprising an involute-like workpiece engaging member, a rotatably mounted support for said workpiece engaging member, a disc carried by said support and having a plurality of circumferentially spaced openings therein, and means receivable in any of said plurality of openings to adjustably but fixedly position said support and workpiece engaging member in predetermined rotary position.

25. In a coring machine or the like of the kind having cutter means, an axially elongated chuck housing for gripping the workpieces, means to move said chuck housing and cutter axially together to effect a cutting operation, and means to load workpieces axially into said chuck housing; the improvement in said means to load comprising power means for moving workpieces axially into said chuck housing, an involute-like stop member slidably and rotatably mounted in said chuck housing and adapted to be adjustably positioned so as to engage the outer edge portion only of the leading end face of a workpiece, spring means urging said stop member toward said workpiece, and control means operative upon said stop member being engaged and moved axially by a workpiece to deenergize said power means.

26. In a coring machine or the like of the kind having cutter means, an axially elongated chuck housing for gripping the workpieces, means to move said chuck housing and cutter axially together to effect a cutting operation, and means to load workpieces axially into said chuck housing; the improvement in said means to load comprising a work support having a first portion located outwardly of one end of said housing and a second portion adapted to be received internally of said housing, a transfer chain extending generally over said chuck housing and outwardly of said one end thereof, the lower reach of said chain extending through said chuck housing, spaced billet engaging dogs extending downwardly from said chain and adapted to engage the opposite end portions of a workpiece positioned on said support, splash guard means attached to one of said dogs and substantially covering one end of said workpieces, and means to move said chain whereby to carry a workpiece into and out of said chuck housing.

27. Apparatus according to claim 26 further characterized by said splash guard means comprising a reversed L-shaped member attached to said dog, and an arched wing-like assembly secured to one arm of said L-shaped member and having a cut away portion so that said dog may be extended or retracted in the vertical direction.

28. In a coring machine or the like having axially aligned cutter means, workpiece chucking means and means to load billets into said machine; the improvement in said means to load comprising a work support, means to feed generally cylindrical workpieces laterally toward said support, means comprising an outwardly and upwardly facing first inclined surface on said support to intercept a workpiece fed laterally toward said support and to position said workpiece in readiness for loading, means comprising an upwardly and inwardly facing second inclined surface adjacent and inwardly of said first inclined surface for directing a workpiece into axially aligned relation with said chucking means, and a lifting arm normally positioned below said first inclined surface and adapted upon upward movement to raise a billet over said first inclined surface, said lifting arm having an upwardly and outwardly facing inclined surface cooperating with said second inclined surface to lower said workpiece into said aligned relation upon the lowering of said arm into its normal retracted position, said means to feed workpieces comprising a pallet supported at one end by said work support and extending laterally outward thereof, means positioned outwardly of said work support to support the outer end of said pallet, said last mentioned means supporting said outer end of said pallet at a higher level than its inner end, said work support being vertically adjustable for the accommodation of workpieces of various sizes, and said means to support the outer end of said pallet being vertically adjustable so that the outer end of said pallet may at all times be supported at a higher level than the inner end thereof.

29. In a coring machine or the like having cutter means, a chuck housing for gripping the workpieces, and means to move said chuck housing and cutter means together to effect a cutting operation; the improvement in said chuck housing comprising a hollow axially extending body, said body being formed from a plurality of axially stacked cylindrical body sections, each of said body sections having means therein to rotatably receive a ring-like chuck actuating member, said body sections being telescopically received within adjacent body sections whereby an end wall portion of one body section acts as a retaining surface for a ring-like chuck actuating member received in an adjacent body member, certain ones of said axially stacked body sections having sets of chucking elements thereon, each of said sets comprising a plurality of chucking elements operatively connected to one of said ring-like chuck actuating members and circumferentially spaced about the body section and adapted for movement radially inward and outward thereof in response to rotation of their associated chuck actuating member, said chucking elements being adapted to grip a generally cylindrical workpiece at spaced points along its axial length.

30. In a coring machine or the like having cutter means, a chuck housing for gripping the workpieces, and means to move said chuck housing and cutter means together to effect a cutting operation; the improvement in said chuck housing comprising a hollow axially extending body, said body being formed of a plurality of axially stacked body sections, certain ones of said axially stacked body sections having sets of chucking elements thereon, each of said sets comprising a plurality of chucking elements spaced circumferentially about the body section and adapted for movement radially inward and outward thereof, said sets of chucking elements being adapted to grip a generally cylindrical workpiece at spaced points along its axial length, the forwardmost one of said body sections having an end wall portion with an opening therein, and bushing means received in said opening and adapted to slidably and rotatably receive said cutter means.

References Cited in the file of this patent

UNITED STATES PATENTS

| | | |
|---|---|---|
| 493,191 | Smith | Mar. 7, 1893 |
| 727,413 | McCracken | May 5, 1903 |
| 811,684 | Adams | Feb. 6, 1906 |
| 1,285,584 | Baines et al. | Nov. 26, 1918 |
| 2,014,679 | Eckroate | Sept. 17, 1935 |
| 2,146,446 | Schmidt | Feb. 7, 1939 |
| 2,353,184 | Nordquist | July 11, 1944 |
| 2,359,167 | Somes | Sept. 26, 1944 |
| 2,399,759 | Rearick et al. | May 7, 1946 |
| 2,405,141 | Hibbard | Aug. 6, 1946 |
| 2,423,244 | Lovely | July 1, 1947 |
| 2,674,850 | Sevenson et al. | Apr. 13, 1954 |